United States Patent
Heyhoe

[19]

[11] Patent Number: 6,146,679

[45] Date of Patent: Nov. 14, 2000

[54] METHOD OF MANUFACTURING AN EXPANDED, EXTRUDED FOOD PRODUCT

[75] Inventor: Thomas Carl Heyhoe, East Doncaster, Australia

[73] Assignee: Koala Property Limited, Tortola, Virgin Islands (Br.)

[21] Appl. No.: 09/052,578

[22] Filed: Mar. 31, 1998

Related U.S. Application Data

[63] Continuation-in-part of application No. 08/943,588, Oct. 3, 1997, abandoned.

[51] Int. Cl.[7] .......................................................... A23P 1/12
[52] U.S. Cl. .................................................................. 426/516
[58] Field of Search .................................... 426/516, 549, 426/94, 249; 425/382, 382.4, 464

[56] References Cited

U.S. PATENT DOCUMENTS

| | | | |
|---|---|---|---|
| 3,619,294 | 11/1971 | Black et al. | .............................. 127/30 |
| 4,225,630 | 9/1980 | Pitchon . | |
| 4,759,939 | 7/1988 | Keller et al. . | |
| 5,009,900 | 4/1991 | Levine et al. . | |
| 5,372,826 | 12/1994 | Holtz et al. . | |
| 5,510,130 | 4/1996 | Holtz et al. . | |

FOREIGN PATENT DOCUMENTS

| | | |
|---|---|---|
| 41 12861 A1 | 11/1991 | Germany . |
| 867350 | 9/1981 | U.S.S.R. . |
| 2186176 | 8/1987 | United Kingdom . |
| WO 86/06938 | 12/1986 | WIPO . |
| WO 96/29887 | 10/1996 | WIPO . |

OTHER PUBLICATIONS

Kollengode et al., "Volatiles Retention as Influenced by Method of Addition during Extrusion Cooking", *Journal of Food Science*, 61(5):985–989, 1079 (1996).

*Primary Examiner*—Milton Cano
*Attorney, Agent, or Firm*—Merchant and Gould P.C.

[57] ABSTRACT

A method of manufacturing a food product wherein a cereal-based pre-mix including a first sensory component, which includes flavoring and/or coloring compounds, is fed into a hopper and fed from the hopper into an extruder, at a controlled rate. A liquid component including a second sensory component, which may also include flavoring and/or coloring compounds, is injected into the mix at a location intermediate the length of the extruder, the mix is then extruded to from the food product.

26 Claims, 4 Drawing Sheets

METHOD OF MANUFACTURING AN EXPANDED, EXTRUDED FOOD PRODUCT

This is a Continuation-in-Part of U.S. patent application Ser. No. 08/943,588, filed Oct. 3, 1997 now abandoned.

FIELD OF THE INVENTION

This invention relates to a method of manufacturing food products and refers particularly, though not exclusively, to a method of manufacturing food products by an extrusion process; and also to food products produced by that method.

DEFINITIONS

Throughout this specification the following terms have the meanings given:
 (i) "reduced fat" means the fat content is less than 18% by weight;
 (ii) "low fat" means the fat content is less than 3% by weight;
 (iii) "reduced colour pick-up" means there is little or no colour pick-up on the hands of a consumer, given normal handling;
 (iv) "sensory component" includes at least one of a range of preferred flavouring compounds and/or at least one of a range of preferred colouring compounds;
 (v) preferred first flavouring and/or colouring compounds are in powder or granular form, are relatively heat stable;
 (vi) the preferred second flavouring and/or colouring compounds are in paste or liquid form and are soluble in water or non-aqueous materials, or are dispersable or soluble in such materials.

BACKGROUND TO THE INVENTION

Food products have long been manufactured by the use of extrusion. Examples can be found regularly through the prior art. Normally a rice or other cereal-based pre-mix is passed through either a single or twin screw extruder. At the time of passing through the extruding head the food product tends to suffer a great loss of flavour as these are normally relatively highly volatile substances. Due to the heat of extrusion and sudden pressure change they can quickly evaporate or flash off. Colouring agents quite often lose effectiveness due to heat degradation as they are quite often heat sensitive. It has therefore been standard practice to subsequently coat the extrudant with colouring and/or flavouring additives, and for further processing to take place. This normally results in the completed food product having a high concentration of colouring additives on the surface which can be picked-up by a consumer of the food product. This pick-up, usually on the fingers, is disliked by many consumers and is particularly relevant in the area of snack foods. Furthermore, particularly when coating is applied by a spray, a relatively high fat content is used to suspend the flavour and colour components as a slurry and obtain a relatively even coating on the extrudant. Snack foods produced by these processes generally have a fat content ranging from 18% to as high as 41%, by weight. These high fat snack foods have calorie contents ranging from 450 up to 575 calories per 100 grams. To consider for example U.S. Pat. No. 4,225,630 to Pitchon, there is described and illustrated a process for the manufacture of a food product by extrusion. However, with this particular food product fat is deliberately added into the extruder in the metering zone, which is the zone or stage directly before the extrusion die. By doing this the fat can be intimately mixed with the material as it is extruded and does not interfere with the expansion or cohesiveness of the product to a significant degree.

U.S. Pat. No. 4,759,939 to Keller & Vowles is directed to a process for producing pretzels. With the process, a dry mixture of flour, corn syrup, solids and salt is introduced into the extruder, and water is added when passing along the extruder. The resultant mixture is extruded at a non-cooking temperature so that a self-suporting ribbon can pass through a region where it is sprayed with a caustic solution. It is subsequently baked. The principal object of the invention is to control the moisture content so that the time taken in the baking oven is reduced. For that reason, the initial mix is substantially dry, and thus the addition of water can be carefully controlled during the extrusion.

International Application PCT/U.S.86/01081(W86/06938) of Nabisco is directed to a continuous process for mixing, cooking and extruding a bran cereal composition in a unitary-extruder. Dry ingredients are mixed and then passed into the twin-screw extruder where they are mixed with a syrup, which includes at least one sugar. The resultant wet mixture is cooked in a cooking zone in the extruder to form a cooked bran mixture, which is then passed through the die to extrude the resultant product. The resultant extrudant pieces fall onto a moving belt and are subsequently dried and toasted. Low pressure is used to avoid plasticisation of the extruded product. There is no colour or flavour added.

In their GB patent application 2186176A, Vincent Process Limited describe a method of manufacturing a food product by extrusion wherein the material is introduced into the extruder and is cooked within the extruder. Water or any other fluid solution is added at high pressure into the extruder immediately before the die head. This is to reduce the temperature of the cooked mass and to arrest expansion as the material leaves the die head. Flavourings and/or colourings can be introduced at the same time, again under high pressure. As the flavour bodies are introduced at that time, the temperature of the mass has been reduced and therefore the flavour bodies are not subjected to the high temperature and pressure cooking process.

A German patent 4,112,861 to Humboldt University describes a process for extruding a food product where whole-grains are fed into an extruder. In passing along the extruder, the grains are ground and at that area of the extruder where the grains have been ground, there is injected a solution, which is acidic, basic, or an electrolyte. The injection is through the wall of the extruder so as to control the pH of the product. The pH value is is adjusted by varying the amount of the acid, base or electrolyte injected. As the product has already been partially ground within the extruder, the contact surface area is increased significantly. However, as the whole-grains are effectively ground during the extrusion process, it is not necessary to pre-grind the grains. The pH of the extruded product is measured so that feedback can be used to control the amount of acid, base or electrolyte added. In this way the browning and formation of flavourings during processing can be controlled more accurately.

USSR patent 867350 relates to equipment for thermo-mechanical processing of starch-containing raw materials. This includes a screw extruder having an injection nozzle for injecting water or like reagent into the relatively dry mass being passed along the screw extruder. A projection on the shaft of the extruder cleans the injector nozzles.

In their article "Volatiles Retention as Influenced by Method of Addition During Extrusion Cooking" as published in Journal of Food Science, Vol. 61 No. 5, 1996 at page 985, Collengode, Hanna & Cupert consider the volatile component retention of a corn-starch based food product passing along an extruder. It was found that volatile component retention was enhanced when they were injected into the metering zone of the extruder barrel as compared to pre-mixing with the feed. A twin-screw extruder was used.

It is therefore one object of the present invention to provide a method of manufacturing food products where flavour and/or colouring compounds are added to the initial mix prior to being fed into a screw extruder, be it a twin-screw or single-screw extruder, and further flavouring and/or colouring compounds are added at an apropriate stage during the extrusion process so that the food products, when extruded, are in a "ready to eat" condition.

Another object to is to provide a food product produced by the method.

It is the further object of the present invention that the addition of the colourings and/or flavourings is such that a reduced fat, or even a low fat, food product can result. For another object of the invention to produce foods which have calorie contents ranging from 420 calories per 100 grams down to as low as 380 calories per 100 grams.

SUMMARY OF THE INVENTION

With the above and other objects in mind the present invention provides a method of manufacturing a food product including:

(a) preparing a cereal-based pre-mix containing first colouring and/or flavouring compounds;
(b) loading the pre-mix into a hopper;
(c) feeding the pre-mix into an extruder at a controlled rate;
(d) heating the mix as it passes along the extruder at a controlled rate;
(e) adding to the mix by injection as it passes along the extruder at at least one location at least one liquid component including at least one second flavouring and/or colouring compound; and
(f) extruding the mix to form the food product.

Preferably, the pre-mix is a cereal-based pulp or flour, preferably a rice flour. More preferably, the colouring compounds result in minimal or no colour pick-up on the hands of a consumer, given normal handling.

Preferably, water is added by injection shortly after the mix has entered the extruder.

Advantageously, the liquid component and/or the at least one second flavouring and/or colouring compound is added after the water. More advantageously, it is added at about the mid-point of the extruder. Alternatively, it is added at about three-quarter's the way along the extruder. The extruder may have a barrel which is heated and/or cooled in sections. Advantageously, the heating varies along the barrel with the amount of heating or cooling being controlled to control the heat degradation in the extruder and/or loss of volatile components on extrusion of the first and second flavouring and/or colouring compounds. The flavouring and/or colouring compounds may be synthetic and/or naturally occurring and/or nature-identical.

The second flavouring and/or colouring compounds may include a fruit and/or vegetable paste, and may include water or non-aqueous carrier, such as glycerol. The more volatile and/or heat sensitive of the flavouring and/or colouring compounds are preferably added by injection at the at least one location.

If required, there may be included a subsequent heating step after extrusion to enhance dryness, loss of moisture and/or crispness.

BRIEF DESCRIPTION OF THE DRAWINGS

In order that the invention may be fully understood there shall now be described by way of non-limitative example a preferred embodiment of the present invention, the description being with reference to the accompanying illustrative drawings in which.

DESCRIPTION OF THE PREFERRED EMBODIMENTS

Figure 1:
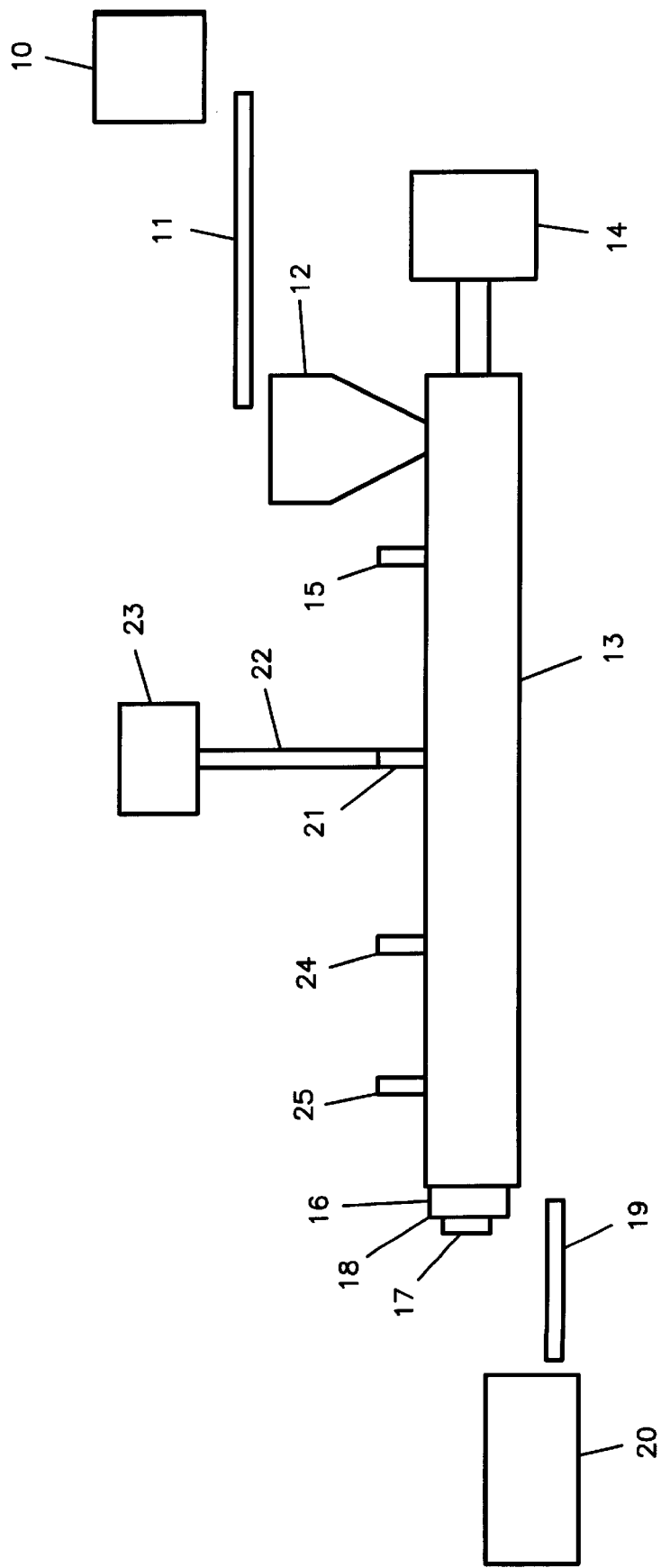
FIG. 1 is a schematic representation of the extruder.
Figure 2:
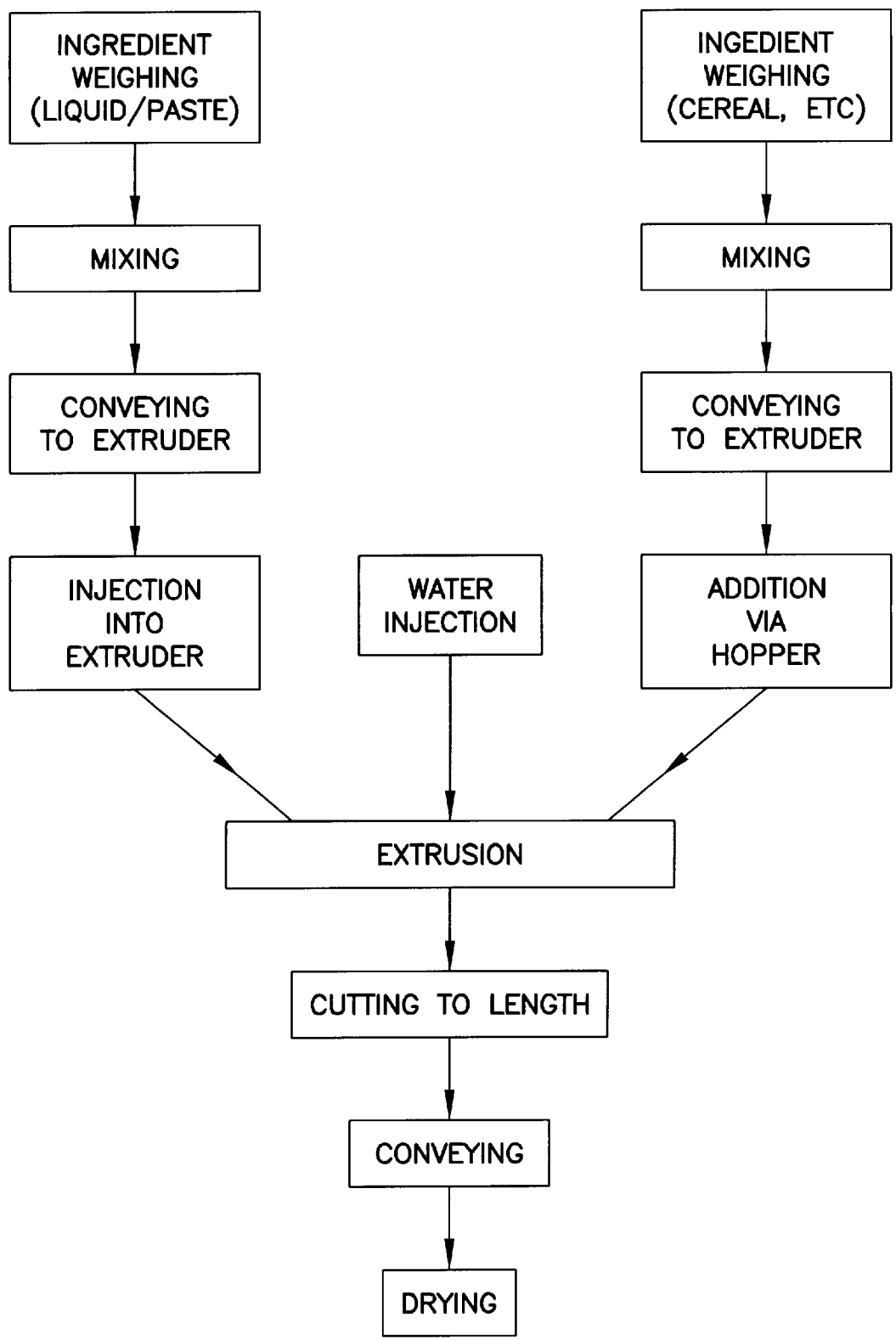
FIG. 2 is a schematic representation of the process of the present invention.

As shown in the drawings there is a hopper generally designated as 12. The initial raw ingredients are pre-mixed in a suitable mixer 10 such as a ribbon blender. They are then fed into the hopper 12 by a conveyor 11. The initial ingredients will generally comprise a rice flour, salt, flavourings and colourings. However, any cereal-based pulp and/or flour may be used. All are preferably in a granular, crystal or powder form.

The pre-mixed ingredients are fed at a controlled rate from hopper 12 into barrel 13 of a screw extruder 14. Screw extruder may be a single screw extruder, double screw extruder, or otherwise. Shortly after the mix enters the extruder 14, water can be added to the mix via an injection port 15. The mix in the extruder has a water content in the range 14% to 21% by weight, preferably about 18%. Rice flour has about 13% moisture. As a result, the water added via the injection port 15 is preferably only about 5%.

At the end of screw extruder is an extrusion head 16 through which the pre-mix passes to the outside atmosphere where most of the water in the product is flashed off and the product is cut to size by means of a rotating knife 17 fitted flush to the exterior surface 18 of the extrusion head 16. From here it falls onto a conveyor 19 and is taken away to cool further before packaging; or through a short drying tunnel 20 to lower the moisture content still more, then to subsequent cooling and packaging. Cutting to length is done by means of the rotating knife 17. The length of the piece cut is dependent on the speed of extrusion of the product, the speed of rotation of the knife 17 and the number of blades on the knife 17 (eg, one, two 180° apart, three 120° apart, etc).

Intermediate the length of barrel 13 is located at least one inlet port 21, preferably about the mid-point of extruder barrel 13, which is fed by a pipe 22 from a reservoir 23. The reservoir 23 contains flavouring and/or colouring compounds and which may or may not require a liquid carrier. These are injected into the mix in the barrel 13 before the resultant product passes through extruder head 16. In this way the mix within the barrel 13 can absorb the flavouring and/or colouring compounds to provide as far as possible an end product which is uniform in character throughout, uniform colouring, uniform flavouring, and with sufficient flavouring and colour retention to provide the required flavour and colour for a consumer. The product added at inlet port 21 may be liquid, paste or powder suspended or dissolved in a liquid or paste.

In one example, the mix is rice flour, salt and flavours and/or colouring compounds in powder form. These compounds may include, for example one or more of: chilli, garlic, paprika, smoke, bacon flavour and the like. The compounds added at port 21 are generally a liquid or emulsion such as, for example, one or more of tomato paste, cheese flavours in a water emulsion, cheese flavours in a glycerol emulsion, salt or the like. As these may include a some water, the amounts added are monitored to prevent the moisture level of the mix in the barrel 13 exceeding the preferred range of 14% to 21% by weight. For example, tomato paste is about 70% water. Excess water added through inlet port 21 would provide a poor quality end product so the level of water added at inlet port 15 is correspondingly reduced.

The more volatile of the flavouring and/or colouring compounds are preferably added at inlet port 21 so their rate of loss due to heating of the barrel 13 may be more controlled. Therefore, their addition should be sufficiently along the barrel 13 to enhance retention, yet sufficiently early along the barrel 13 to enhance their absorption into the mix as it passes along the barrel 13. To this must be added the factor of the heating of the barrel 13, which is required to cook the mix. The level of heating is controlled along the barrel 13 so that the heating after port 21 can be reduced to control the loss of the volatile components of the is flavouring and/or colouring compounds added at port 21. For example, the temperature at extrusion head 16 would normally be about 160° C. for an extruded rice flour product. By reducing that temperature to 128° C., retention of the volatile and/or heat degradable components of the flavouring and/or colouring compounds is enhanced.

Multiple injection along the barrel 13 is possible. Further injection ports 24, 25 may be used in addition to, or in stead of, port 21, depending on the nature of the compounds to be added and/or the mix in the barrel 13, as well as the required characteristics of the end product.

By accurately controlling the temperature at the various stages of the extrusion process, the product passing to conveyor 19 will be in a ready-to-eat condition although some products may benefit from post-extrusion drying in dryer 20.

The nature of the temperature controls used will vary according to the nature of the pre-mix, the various flavouring and colouring compounds used, the moisture content, the equipment used, the feed rates, the internal design of the barrel and the screw drive, the extruder head, the barrel length, and the degree of compression of the mix in the barrel. In general, the pre-mix will have a relatively low moisture content. Excess heat will cause unwanted scorching. As the mix is feed along the barrel, it is compressed. This compression, and the friction of its movement, as well as internally-generated stresses, generate heat. Therefore, there may be no need to add heat or, if heat is to be added, only at a low level. In some instances, cooling may be required. After the addition of the water and the second sensory component, the mix is at its optimum moisture content. Therefore, it flows more easily and thus the heat generated may be less. If the liquid component of the second sensory component has lubricating qualities (eg. glycerol) the heat generated by friction will be further reduced. Therefore, addition of heat may be necessary. However, for a relatively dry mix, cooling may still be required. In the region before the extruder head, to heating is applied to cause at least some of the moisture to become steam to thus complete the cooking of the product.

The temperature at the extruder head may vary over a considerable range due to the factors described above. Temperatures as low as 125° C. may be possible, as may temperatures as high as 195° C. A mid point of 165° C. was used in the examples given below.

Cutting into various lengths may be required, if desired. This can be done in any known way.

The food product resulting from this process will generally therefore comprise the base material of the pre-mix, together with the flavourings and colourings. If the pre-mix is generally rice-based the pre-mix will be low fat. By using particular flavouring and/or colouring compounds the fat content of the resultant food product will be less than 10%. By using preferred flavouring and/or colouring compounds the fat content can be reduced to below 3%, so that the food product is generally a low fat rather than reduced fat product. Therefore, the food product has low colour pick-up, full flavour, full colouring, and is reduced or low fat.

If required, the food product may be subjected to a subsequent heating to enhance moisture reduction, dryness and/or crispness.

EXAMPLES

Five trials were conducted using the above principles.

The base cereal selected for the trials was rice flour ("Sunblend" 584 from Ricegrowers Co-operative, Leeton, Australia).

The flavours and colours selected were:

| | |
|---|---|
| Cheese | Cheddar flavour 9525 obtainable from Chr. Hansen Pty Ltd |
| Tomato Paste | 23.8%, TSS, Leggo's (Division of Simplot Australia) |
| Smoke | Hickory Smoke Flavour 42.2066, Speciality Flavours & Fragrances |
| Garlic | Garlic Powder, McCormick Foods Australia Pty Ltd |
| Paprika | Ground Paprika, Master Foods of Australia |
| Chilli | Ground Chillies, Master Foods of Australia |
| Colour | A-4000K-WSP (water soluble annatto), Chr. Hansen Pty Ltd |
| Salt | (sodium chloride) was also used. |

Five formulations were trialed, two cheese flavoured products, two cheese & bacon flavoured products and one barbecue flavoured product. These were run respectively. Details of the formulations in terms of composition of the dry blends and the liquid injection components are set out below.

Dry Blends

| | Run 1 | Run 2 | Run 3 | Run 4 | Run 5 |
|---|---|---|---|---|---|
| Dry Blends | | | | | |
| Rice flour (kg) | 10.0 | 10.0 | 10.0 | 10.0 | 10.0 |
| Colour (g) | 2.0 | 4.0 | 4.0 | 4.0 | |
| Salt (g) | 70.0 | 60.0 | 70.0 | 70.0 | 90.0 |
| Smoke Flavour (g) | | | 15.0 | 15.0 | 30.0 |
| Garlic (g) | | | | | 12.5 |
| Chilli (g) | | | | | 12.5 |
| Paprika (g) | | | | | 50.0 |
| Liquid Injection grams | | | | | |
| Cheese flavour | 300.0 | 600.0 | 600.0 | 600.0 | |
| Tomato Paste | | | | | 500.0 |
| Water | 900.0 | 600.0 | 600.0 | | 166.7 |
| Glycerol | | | | 600.0 | |

The extruder used for the trials was an APV Baker Model MPF 40 twin screw extruder.

The flavour injection pump was a Masterflex Model 7518-00 peristaltic pump.

The moisture content of the rice flour was determined to be 13.0% and water injection was adjusted as necessary, taking into account any water component in the downstream flavour injection, to maintain a preferred overall moisture level of 18% in the production in the extruder barrel. Initially, for rice flour only, water injection rate was 1.53 kg per hour (25.5 grams per minute). This was based on the moisture content of the rice flour being determined to be 13.0%.

Dry cereal blend addition rate was 25 kg per hour (417 grams per minute). Some minor variation in this feed rate occurred.

Addition rates of the liquid injection components were as follows:

| Run 1 | 26 grams per minute |
|-------|---------------------|
| Run 2 | 27 grams per minute |
| Run 3 | 27 grams per minute |
| Run 4 | 27 grams per minute |
| Run 5 | 23 grams per minute |

Physical characteristics of the trial products were assessed in the following ways:

Bulk density—product was placed in a cylindrical container and the container base taped gently. Further product was added with gentle taping and rotation until the product fill height was level at the one litre mark. The weight of product in the container was then determined to the nearest one tenth of a gram. The results given for bulk density in the table below are each the average of three determinations rounded to the nearest gram.

Piece weight—the total weight of 20 randomly selected extruded pieces from each trial run was determined to the nearest one tenth of a gram. This value was divided by 20 to give an average piece weight.

Length—10 pieces were selected at random from each trial run and their lengths measured to the nearest millimetre using a standard ruler. These values were averaged to give an average piece length (to the nearest millimetre).

Diameter—10 pieces were selected at random from each trial run and their diameters measured to the nearest tenth of a millimetre using a vernier calliper (Mitutoyo Corporation, Japan). These values were averaged to give an average piece diameter (to the nearest millimetre).

The reference level was determined using rice flour and water only.

The results of these tests, tabulated below, demonstrate that:

- the addition of cheese flavour by injection as a flavour/water emulsion (Runs 1 to 3) gives an extruded product with desirable density characteristics;
- the addition of cheese flavours by injection as a flavour/glycerol dispersion (Run 4) gives an extruded product which is substantially denser than that produced with flavour/water emulsion injection. This product more closely resembles the texture of baked snack products;
- the addition of tomato paste, diluted with a small amount of water, by injection (Run 5) gives an extruded product with desirable density characteristics.

| Product   | Bulk density (g/L) | Piece Weight (g) | Length (mm) | Diameter (mm) |
|-----------|--------------------|------------------|-------------|----------------|
| Reference | 49                 | 0.21             | 21          | 13             |
| Run 1     | 45                 | 0.21             | 25          | 12             |
| Run 2     | 49                 | 0.20             | 27          | 11             |
| Run 3     | 48                 | 0.20             | 26          | 11             |
| Run 4     | 84                 | 0.20             | 21          | 10             |
| Run 5     | 41                 | 0.21             | 28          | 12             |

Fat, moisture and salt contents of representative samples of the trial products were determined. The methods of analyses were all standard AOAC methods being 950.46 for moisture, 922.06 for fat and 937.09 for salt (chloride).

The results, shown below demonstrate the low fat and thus low calorie content of the trial products compared to regular snack products which have been coated after extrusion.

| Product   | Moisture (%) | Fat (%) | Salt (%) |
|-----------|--------------|---------|----------|
| Reference | 6.7          | 1.0     | 0.04     |
| Run 1     | 8.0          | 2.1     | 0.8      |
| Run 2     | 7.3          | 2.7     | 0.7      |
| Run 3     | 8.0          | 1.8     | 0.8      |
| Run 4     | 7.3          | 2.1     | 0.8      |
| Run 5     | 6.1          | 2.2     | 1.1      |

The sensory characteristics, specifically flavour, colour, crispness (in the mouth) and feel (on the fingers) of the trial products were assessed, together with the reference (straight extruded rice) and are tabulated below.

The results demonstrate that snack products of acceptable, desirable, satisfactory or excellent flavour, colour and crispness were produced by the method described above. Moreover, the results demonstrate that these products tend to not leave significant greasy, coloured residues on the fingers, in contrast to standard snack products, which are coated after extrusion.

| Product   | Flavour                           | Colour              | Crispness          | Feel                                        |
|-----------|-----------------------------------|---------------------|--------------------|----------------------------------------------|
| Reference | cereal                            | cream               | good               | no greasy feel, no residue on fingers       |
| Run 1     | mild cheese, salt                 | pale gold/yellow    | at least acceptable | no greasy feel, no residue on fingers       |
| Run 2     | mild cheese                       | pale gold           | good               | no greasy feel, no residue on fingers       |
| Run 3     | mild cheese, salt, smoke          | very pale orange    | at least acceptable | no greasy feel, no residue on fingers       |
| Run 4     | mild cheese, salt, smoke          | pale orange         | good               | no greasy feel, no residue on fingers       |
| Run 5     | spice, salt, light tomato, smoke  | light pinkish yellow | good              | no greasy feel, no residue on fingers       |

The trials produced extruded low-fat snack products of acceptable or better quality.

The use of glycerol or other non-aqueous carrier in the emulsion for the second flavouring and/or colouring compounds added at injection port 21 modifies product density.

The amount and type of such addition allows products with different crispness characteristics to be manufactured which are different to those produced using only water. Such products also have strong appeal to consumers. The tomato paste could be replaced with any other fruit-based paste, if desired. Fruit pastes such as apricot added at injection port 21 together with the inclusion of a sugar or intense sweetener in the cereal pre-mix would allow the manufacture of sweet rather than savoury snack products.

Furthermore, rather than one injection point for the second flavouring and/or colouring compounds along the barrel, a multiple number of such points may be used. The compounds injected at each point may be the same, or different. For example, certain colourings may be added at one injection point, and flavourings at another injection point.

Figure 3:
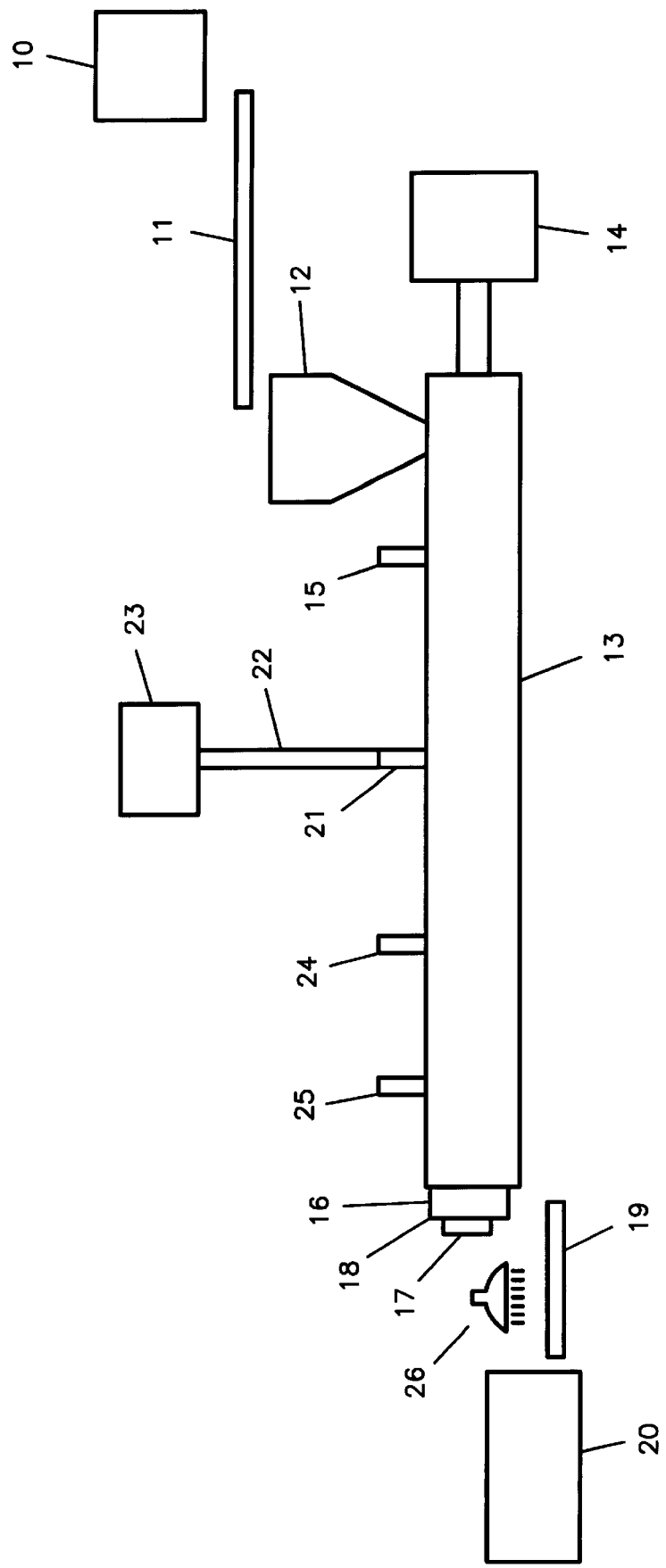
FIG. 3 is a schematic representation corresponding to FIG. 1 of a second embodiment of the present invention.
Figure 4:
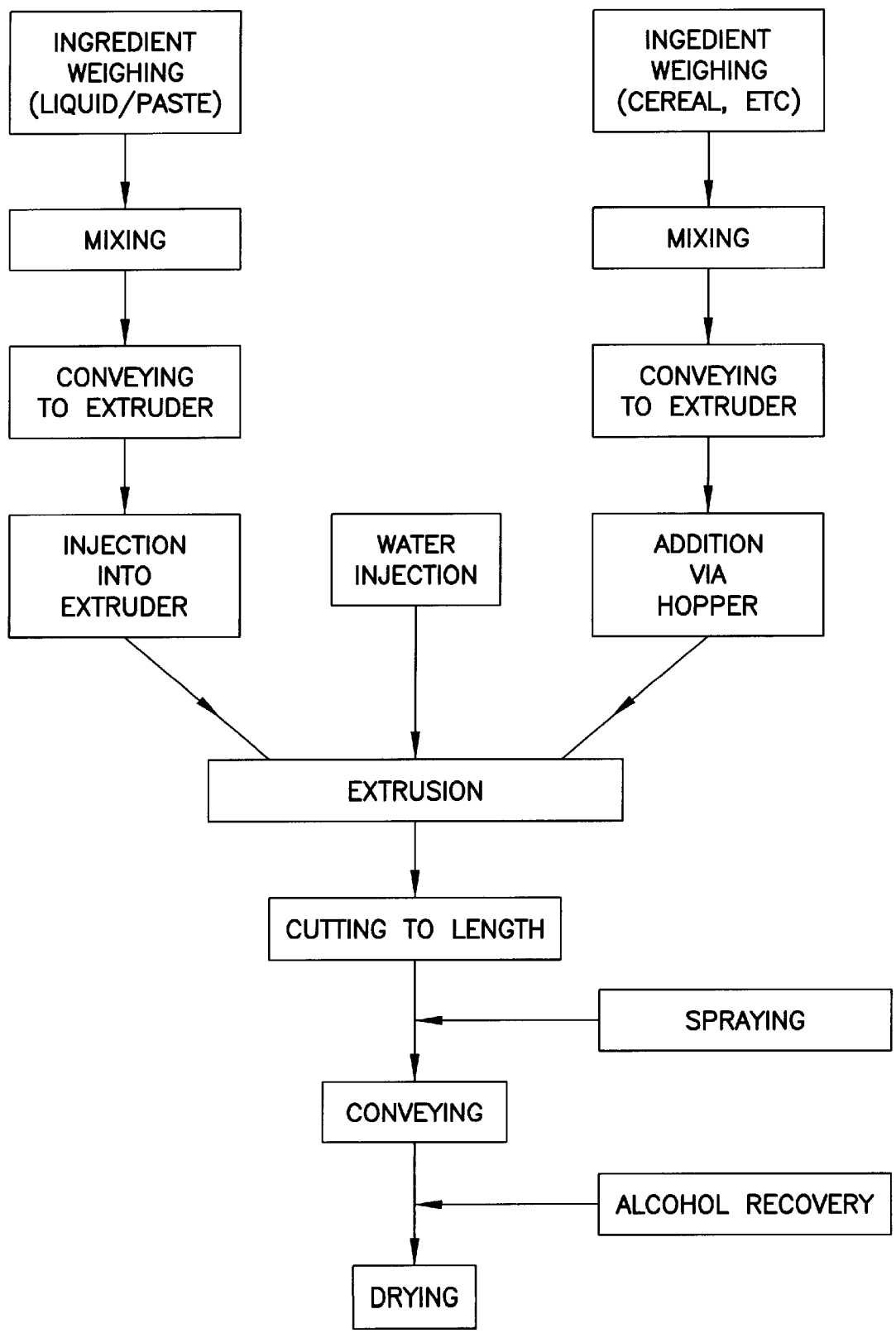
FIG. 4 is a schematic representation corresponding to FIG. 2 of the second embodiment.

Also, if desired, and particularly when delicate or non-strong flavours are involved, it may be desired to have flavour enhancement added after extrusion. This may be done by adding volatile organic flavour components by spraying after extrusion. The spraying may be with those volatile organic flavour components in an alcohol carrier such as 95% ethanol and 5% water. By using an alcohol carrier, the alcohol will evaporate due to the warmth retained in the product after extrusion and/or on or with subsequent heating, and the alcohol can be recovered for re-use. The flavour carried by the alcohol will be absorbed by the food product. This may be of advantage where, for example, the flavour being added is a delicate flavouring and where the volatile organic components tend to evaporate on heating during the extrusion process which may leave the non-volatile component of the flavour compound in the food product. Where this non-volatile component is of a proteinaceous nature residual bitterness or bitter flavour may occur. By having this additional step, in those particular instances where extra flavouring is required, the problem of residual bitterness or flavour imbalance may be overcome. This is illustrated in FIG. 3 where a spray head 26 is representative of the spray mechanism. The alcohol-based carrier may be recovered before, during or subsequent to the dryer 20.

Whilst there has been described in the foregoing description preferred embodiments of the present invention, it will be understood by those skilled in the technology concerned that many variations or modifications and details of design, construction process or composition may be made without departing from the present invention.

It will be understood that the invention disclosed and defined herein extends to all alternative combinations of two or more of the individual features mentioned or evident from the text or drawings. All of these different combinations constitute various alternative aspects of the invention.

It will also be understood that where the term "comprises" or its grammatical variants, is employed herein, it is equivalent to the term "includes" and is not to be taken as excluding the presence of other elements or features.

What is claimed is:

1. The method of manufacturing an expanded, extruded food product selected from the group consisting of a reduced fat food product and a low fat food product, the method comprising the steps of:
   (a) preparing a cereal-based pre-mix containing at least one first sensory component selected from the group consisting of a first colouring compound, salt smoke flavor, garlic, chili and paprika;
   (b) loading the pre-mix into a hopper;
   (c) feeding the pre-mix at a controlled rate into an extruder having a barrel;
   (d) adding to the premix by injection as it passes through the extruder, at at least one location along the barrel of the extruder, at least one liquid component including at least one second sensory component selected from the group consisting of a second colouring compound and a second flavouring compound, the second sensory component being mixed into the premix in the barrel of the extruder to form a substantially uniform mix;
   (e) controlling of the temperature of the mix as it passes along the barrel of the extruder so that the first sensory component and the second sensory component are retained in the mix and the mix is cooked without scorching; and
   (f) extruding the mix to form the expanded reduced fat or low fat food product.

2. The method as claimed in claim 1, wherein at least one of the first and second sensory components is a colouring compound and the method produces a product exhibiting reduced color pick-up on the hands of a consumer given normal handling.

3. The method as claimed in claim 1, wherein the second flavouring compounds are the same as the first flavouring compounds.

4. The method as claimed in claim 1, wherein the second flavouring compounds are different to the first flavouring compounds.

5. The method as claimed in claim 1, wherein the second colouring compounds are the same as the first colouring compounds.

6. The method as claimed in claim 1, wherein the second colouring compounds are different to the first colouring compounds.

7. The method as claimed in claim 1, wherein the first sensory component, and the second sensory component and the liquid component, are of reduced fat content.

8. The method as claimed in claim 1, wherein the first sensory component, the second sensory component and the liquid components are all low fat.

9. The method as claimed in claim 1, wherein the at least one first sensory component is in powder form.

10. The method as claimed in claim 1, wherein the first sensory component is in granular form.

11. The method as claimed in claim 1, wherein the at least one second sensory component is in a liquid form.

12. The method as claimed in claim 1, wherein the liquid component is water.

13. The method as claimed in claim 1, wherein the liquid component is glycerol.

14. The method as claimed in claim 1, wherein the at least one first sensory component is in powder form, at least one second sensory component is in liquid form; and the liquid component is water.

15. The method as claimed in claim 14, wherein the at least one second sensory component is at least one selected from the group consisting of cheese flavour and tomato paste.

16. The method as claimed in claim 1, wherein there is further added water by injection to the mix as it passes along the extruder prior to the addition of the at least one second sensory component.

17. The method as claimed in claim 16, wherein the maximum water level in the mix is between 14 and 21 percent by weight.

18. The method as claimed in claim 17, wherein the maximum water level in the mix is 18 per cent by weight.

19. The method as claimed in claim 1, wherein the at least,one location is between 25% and 75% along the extruder.

20. The method as claimed in claim 1, wherein the at least one location is substantially at the mid-point of the extruder.

21. The method as claimed in claim 1, wherein there is included an additional step after the extruding of the mix to form the food product; the additional step including spraying the food product with a spray that includes volatile organic flavour components in a carrier.

22. The method as claimed in claim 21, wherein the carrier is an alcohol-based carrier.

23. The method as claimed in claim 22, wherein the alcohol-based carrier is 95% ethanol and 5% water.

24. The method as claimed in claim 22 where the alcohol is caused to evaporate after spraying by heating or due to the inherent warmth of the food product, the evaporated alcohol being recovered for re-use.

25. The method-claimed in claim 1, wherein the premix is dry fed into the extruder.

26. The method as claimed in claim 1, wherein the at least one location is at a position along the barrel of the extruder no more than about 75% of the distance from the point where the pre-mix is fed into the extruder to the point where the mix is extruded.

* * * * *